United States Patent [19]

Eapen

[11] Patent Number: 5,281,647
[45] Date of Patent: Jan. 25, 1994

[54] POLYMERIC PLASTICIZERS AND A PROCESS FOR PREPARING THE SAME

[75] Inventor: Thomas Eapen, Elizabeth, N.J.

[73] Assignee: Miles Inc., Pittsburgh, Pa.

[21] Appl. No.: 974,048

[22] Filed: Nov. 10, 1992

[51] Int. Cl.$^5$ .............................................. C08J 3/18
[52] U.S. Cl. .................... 524/314; 528/272; 528/300; 528/302; 528/307; 525/437; 525/445
[58] Field of Search ............... 528/272, 300, 302, 307; 525/437, 445; 524/314

[56] References Cited

U.S. PATENT DOCUMENTS

| | | | |
|---|---|---|---|
| 2,815,354 | 12/1957 | Wilkingson et al. | 554/164 |
| 3,330,789 | 7/1967 | Aylesworth et al. | 528/272 |
| 3,700,957 | 10/1972 | Daniels | 524/147 |
| 3,972,962 | 8/1976 | Williams et al. | 525/174 |
| 4,122,057 | 10/1978 | Lamont et al. | 524/311 |
| 4,133,794 | 1/1979 | Lamb | 524/311 |
| 4,338,431 | 7/1982 | König et al. | 528/272 |
| 4,401,720 | 8/1983 | Davis et al. | 428/483 |
| 4,504,652 | 3/1985 | Widder et al. | 528/480 |
| 4,670,490 | 6/1987 | Yoshida et al. | 524/115 |
| 4,824,990 | 4/1989 | Mertz et al. | 560/90 |
| 4,876,304 | 10/1989 | Mertz et al. | 524/314 |

Primary Examiner—John Kight, III
Assistant Examiner—S. A. Acquah
Attorney, Agent, or Firm—Joseph C. Gil; Godfried R. Akorli

[57] ABSTRACT

The present invention relates to a polymeric plasticizer and a process for plasticizing material therewith; said polymeric material comprises a reaction product of a diacid with a highly hindered diol and another diol in a stoichiometric excess of the acid over the diol, followed by reacting the resulting product containing an acid end group with an alcohol, followed by removing residual alcohol to obtain a final product having a hydroxyl value of less than 20.

22 Claims, No Drawings

POLYMERIC PLASTICIZERS AND A PROCESS FOR PREPARING THE SAME

BACKGROUND OF THE INVENTION

1. Field of the Invention

The present invention relates polymeric plasticizers derived from modified polyesters. The plasticizers of the present invention are particularly useful in a variety of polymeric compositions, particularly polyvinyl chloride, rubber and the like compositions.

2. Brief Description of the Prior Art

Generally, polymeric plasticizers are known in the art. However, the art-known polymeric plasticizers tend to be limited in their use because they are often "composition-specific". Hence, there has been continuous work to develop plasticizers that are effective for a variety of compositions.

U.S. Pat. No. 4,338,431 discloses an improved process for producing neopentyl glycol polyesters of certain dicarboxylic acids. U.S. Pat. No. 3,330,789 discloses polyester polyols based on neopentyl glycol and other glycols esterified with aromatic and aliphatic carboxylic acids.

By the present invention, there is provided novel polymeric plasticizers that can be effective in polyvinyl chloride and/or rubber. Said plasticizers can be produced at a relatively low cost.

SUMMARY OF THE INVENTION

In accordance with the foregoing, the present invention encompasses a polymeric plasticizer comprising a reaction product of a diacid or its equivalent selected from the group consisting of carboxylic acids, their anhydrides and/or their methyl esters, such as sebacic acid, glutaric acid, azelaic acid and/or adipic acid with a highly hindered diol selected from the group consisting of 2,2,4-trimethyl, 1,3-pentane diol, 2-butyl-2-ethyl, 1,3-pentane diol, 1,4-cyclohexane dimethanol and hydroxy pivalyl hydroxy-pivalate their substituted species and substituted neopentyl glycol, in combination with a small amount another diol selected from the group consisting of butylene glycols, propylene glycol and ethylene glycol.

In accordance with the invention, a process for preparing the reaction product comprises reacting a stoichiometric excess of the diacid over the diol, followed by reacting the resulting product containing an acid end group with an alcohol, and further followed by removing residual alcohol from the reaction product, at a temperature in the range of about 225° C. to 240° C. and pressure under 6 Torr absolute vacuum. The resultant reaction product comprising the polymeric plasticizer has a hydroxyl value of less than 60, and preferably from 10 to 20.

Also encompassed by the claimed invention is the process for plasticizing a composition comprising combining with said composition by admixing it with the above polymeric plasticizer in an amount which is effective to produce the desired plasticization. In the practice of this invention as a plasticizer, it was rather surprising that the products containing the compositions of the invention are advantageously resistant to solvent extraction and resistant to detergent (with water) extraction. The following more fully describe the invention.

DETAILED DESCRIPTION OF THE INVENTION

In accordance with the claimed invention, the polymeric plasticizer comprises an alcoholic group terminated polyester having average molecular weight (mw) from 1000 to 6000 and preferably 2500 to 5000 and a hydroxyl value of less than 50.

The polymeric plasticizer can be prepared by reacting a diacid in a stoichiometric excess with a combination of diols comprising a highly hindered diol and a small amount of another diol which is different from the hindered diol and is typically a short chain diol. The resulting reaction product having a acid end group is reacted with a stoichiometric excess of an alcohol. Typically a residual alcohol is removed, by stripping to produce a composition of matter having a hydroxyl value of less than 60.

The diacids useful herein can contain from 5 to 13 carbon atoms and preferably 6 to 10 carbon atoms. Illustrative but non-limiting examples of the diacids can be aliphatic acids selected from the group consisting of carboxylic acids, their anhydrides and/or their methyl esters, such as sebacic acid, glutaric acid, azelaic acid and adipic acid which is presently preferred.

By the term highly hindered diol is meant that the hydroxyl groups of the diol are highly hindered, typically by steric means whereby said hydroxyl groups are not easily accessible during their reaction with the acids. The hindered diol can contain from 8 to 10 carbon atoms. The hindered diols of the invention is described hereinbelow with particularity to 2,2,4-trimethyl-1,3-pentanediol (TMPD glycol) for the purpose of illustration without limitation of other glycol that are useful herein. TMPD glycol is of a relatively high molecular weight branched structure; it contains a sterically hindered secondary hydroxyl group and is hydrophobic in nature. It is believed that these characteristics impart improved properties to the the polymeric plasticizer. Other examples of the hindered diols can be selected from the group consisting of 2 butyl-2-ethyl-1,3-pentane diol, 1,4-cyclohexane dimethanol and hydroxy pivalyl hydroxy-pivalate their substituted species and substituted neopentyl glycol.

The others diol useful herein are short chain diols having from about 2 to 5 carbon atoms. The other diols can be selected from the group consisting of a butylene glycol, propylene glycol, ethylene glycol and mixture thereof.

The amount of hindered diol employed herein is from about 85 to 90 percent by weight of the total diol content. The amount of the other diol can be from about 10 to 15 percent by weight of the total diol content. The moles ratio of the acid to the diols can be from about 1.10 to 1.16:1.

In the process of preparing the polymeric plasticizer, the diacid can be reacted with the diols over a temperature range of about 180° C. to 250° C., over a period of about 8 to 16 hours. The reaction can be monitored by following the acid value, viscosity and hydroxyl value of the reaction product. At an acid value of about 60 to 30, the reaction of the diacid with the diol is considered complete.

The resulting product is reacted with a stoichiometric excess of an alcohol over a temperature range of about 180° C. to 225° C. and preferably 180° C. to 215° C., over a period of about 4 hours to 6 hours. Typically the stoichiometric excess is up to about 0.20 moles. The reaction can be monitored by following the acid value of the reaction product. At an acid value of 0 to about 2, the reaction of the diacid with the alcohol is considered complete. The alcohols useful herein can contain from about 4 to 13 and preferably 8 to 10 carbon atoms. Illustrative but non-limiting examples of the alcohols can selected from the group consisting of 2-ethyl hexanol which is preferred, isooctanol, n-octanol and pentanol.

In accordance with this invention residual alcohol is removed from the reaction product obtained from the above process step, until the product has a hydroxyl value of less than 60 and preferably from 20. Typically, the residual alcohol is removed by stripping.

Catalysts and solvents can be employed for ease of handling and/or reaction.

In the practice of the invention, the polymeric plasticizer can be effectively used in plasticizing rubber, polyvinyl chloride and/or the like materials. As a plasticizer, the polymeric plasticizer can be compounded with the rubber or polyvinyl chloride material by mixing therewith an amount of the plasticizer sufficient to plasticize the rubber or polyvinyl chloride. Typically the polymeric plasticizer is employed in a percent composition of about 35 to 65 and preferably 45 to 55 percent by weight based on the total weight of the composition. Typically the plasticizer is admixed with the rubber at temperature ranging from ambient to elevated temperatures and preferably at about 50° to 150° C.

The plasticized materials have been found to exhibit improved properties of low extractability of the plasticizer, relative to oils and detergents, very high electrical resistance and other desirable properties. This and other aspects of the invention are further illustrated by the following non-limit examples.

EXAMPLES

Example 1

A properly equipped reaction vessel (with a decanter attached to condenser, a nitrogen blanket and vacuum pump) was charged with 555 grams (gms) of trimethyl pentane diol (TMPD), 72 gms of propylene glycol, 700 gms of adipic acid and 1.93 gms of dibutyl tin oxide catalyst. The reaction mixture was heated to 175° C. at atmospheric pressure. When all the charge materials went into solution, nitrogen sparge was introduced to reaction vessel. The reaction mixture was maintained at 175° C. for one hour so that more than half amount of water of reaction was collected in the decanter. The reaction mixture was then heated to 215° C. At 215° C., the nitrogen sparge was cut off and 25 Torr of absolute vacuum was applied. Vacuum was maintained till the acid value dropped to 50 mg KOH/gm. At the acid value of 50 mg KOH/gm, vacuum was cut off with a nitrogen sparge and the resulting mixture was cooled to 180° C. 154 gms of 2-ethyl hexanol was added at 180° C. and heated back to 215° C. The reaction was maintained at 215° C. for 2 hours. 10 inches of vacuum was applied to enhance the removal of water of reaction. The reaction was continued to get a final acid value of 1. Less than 10 Torr absolute vacuum was applied to remove the unreacted 2-ethyl hexanol. The resultant product was cooled to 90° C. and filtered. The product has a viscosity of 4740 centipoises (cps) at 25° C. and OH value was 17.

EXAMPLE 2

Using a procedure analogous to that described in Example 1, 3710 gm of TMPD, 4679 gm of adipic acid, 482 gm of propylene glycol and 13.0 gm of dibutyltin oxide were reacted to an acid value of 60 and then 1580 gm of 2-ethyl hexanol was used to terminate the acid ends. The excess, unreacted 2-ethyl hexanol was vacuum distilled and the product was cooled and filtered. The viscosity of this product was 2200 cps at 25° C. and OH value was 20.

Evaluations

A plasticized composition in accordance with the invention comprising 55 part polyvinyl chloride and 45 parts of the instant plasticizer which was prepared in essentially the same manner as described above was evaluated and compared with a control composition having the same proportion of a state of the art plasticizer "G-54", available from C.P. Hall.

The evaluation comprised testing volume resistivity (ASTM D 257), tensile strength and elongation (ASTM D 412-75), dynamic mechanical thermal analyzer (DMTA), and Extraction respectively in paraffin oil, and soap ("Ivory" soap available from Procter & Gamble Co.) as follows.

TABLE 1

| Test Sample | Volume Resistivity |
|---|---|
| G-54 | $2.4 \times 10^{11}$ |
| Staflex 621 | $4.8 \times 10^{12}$ |

TABLE 2

| Test Sample | Tensile Strength (psi) | Elongation (%) | 100% Mod (psi) |
|---|---|---|---|
| Staflex 621 | 1030 | 191 | 751 |
|  | 1007 | 190 | 719 |
|  | 1016 | 192 | 725 |
|  | 1011 | 198 | 690 |
|  | 959 | 175 | 743 |
| G-54 | 789 | 175 | 610 |
|  | 810 | 175 | 624 |
|  | 833 | 183 | 636 |
|  | 853 | 174 | 657 |
|  | 840 | 181 | 619 |

TABLE 3

| | DMTA-Test Results: | |
|---|---|---|
| Test Sample | Transition Onset | Transition Midpoint |
| Staflex 621 | −3° C. | 15° C. |
| G-54 | −11° C. | 6° C. |

TABLE 4

| Test Results: Extraction By 1% Soap Solution | |
|---|---|
| Test Sample | % Extracted |
| G-54 | 1.19 |
|  | 1.13 |
|  | Mean: 1.16 |
| Staflex 621 | .33 |
|  | .32 |
|  | Mean: .33 |

TABLE 5

| Test Results: Paraffin Oil Extraction | |
|---|---|
| Test Sample | % Extracted |
| G-54 | 1.63 |

TABLE 5-continued

| Test Results: Paraffin Oil Extraction | |
|---|---|
| Test Sample | % Extracted |
| Staflex 621 | 1.64 |
| | Mean: 1.64 |
| | 2.08 |
| | 2.03 |
| | Mean: 2.05 |

As would be realized from the above tables, the test samples of the present invention perform significantly better than the art-related test samples.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for preparing a polymeric plasticizer comprising, reacting a diacid or its equivalent with a highly hindered diol and another diol in a stoichiometric excess of the acid over the diols, followed by reacting the resulting product containing an acid end group with an alcohol, and further followed by removing residual alcohol to obtain a final product having a hydroxyl value of less than 20.

2. The process of claim 1 wherein the diacid or its equivalent is selected from the group consisting of a dicarboxylic acid, an anhydride thereof, a methyl ester thereof and a mixture thereof.

3. The process of claim 2 wherein the the dicarboxylic acid is selected from the group consisting of adipic acid, sebacic acid, glutaric acid, azelaic acid, and a mixture thereof.

4. The process of claim 1 wherein the highly hindered diol is selected from the group consisting of 2,2,4-trimethyl-1,3-pentane diol, 2-butyl-2-ethyl-1,3-pentane diol, 1,4-cyclohexane-dimethanol, hydroxy-pivalyl hydroxy-pivalate, neopentyl glycol and a mixture thereof.

5. The process of claim 1 wherein the other diol is selected from the group consisting of a butylene glycol, propylene glycol, ethylene glycol and mixture thereof.

6. The process of claim 1 wherein the diacid is reacted with the diols in a mole ratio of 1.10 to 1.16:1.

7. The process of claim 1 wherein the alcohol is selected from the group consisting of 2-ethyl hexanol, isooctanol, n-octanol, pentanol nonyl alcohol and a mixture thereof.

8. The process of claim 1 wherein the alcohol is reacted in the mole ratio of 1.20:1.

9. The process of claim 1 wherein residual alcohol is removed by stripping.

10. The process of claim 1 wherein the polymeric plasticizer has a hydroxyl value of 0 to 20.

11. A polymeric plasticizer comprising, a reaction product of a diacid with a highly hindered diol and another diol in a stoichiometric excess of the acid over the diols, followed by reacting the resulting product containing an acid end group with an alcohol, and further followed by removing residual alcohol to obtain a final product having a hydroxyl value of less than 20.

12. The polymeric plasticizer of claim 11 wherein the diacid or its equivalent is selected from the group consisting of a dicarboxylic acid, an anhydride thereof, a methyl ester thereof and a mixture thereof.

13. The polymeric plasticizer of claim 12 wherein the the dicarboxylic acid is selected from the group consisting of adipic acid, sebacic acid, glutaric acid, azelaic acid, and a mixture thereof.

14. The polymeric plasticizer of claim 11 wherein the highly hindered diol is selected from the group consisting of 2,2,4-trimethyl-1,3-pentane diol, 2-butyl-2-ethyl-1,3-pentane diol, 1,4-cyclohexane-dimethanol, hydroxy-pivalyl hydroxy-pivalate, neopentyl glycol and a mixture thereof.

15. The polymeric plasticizer of claim 11 wherein the other diol is selected from the group consisting of a butylene glycol, propylene glycol, ethylene glycol and mixture thereof.

16. The polymeric plasticizer of claim 11 wherein the diacid is reacted with the diols in a mole ratio of 1.10 to 1.16:1.

17. The polymeric plasticizer of claim 11 wherein the alcohol is selected from the group consisting of 2-ethyl hexanol, isooctanol, n-octanol, pentanol nonyl alcohol and a mixture thereof.

18. The polymeric plasticizer of claim 11 wherein the alcohol is reacted in the mole ratio of 1.20:1.

19. The polymeric plasticizer of claim 11 wherein the residual alcohol is removed by stripping.

20. The polymeric plasticizer as recited in claim 11 having a hydroxyl value of 0 to 20.

21. A process for plasticizing a rubber or polyvinyl chloride material comprising compounding said material with the polymeric plasticizer of claim 11.

22. A plasticized material which is prepared by the process of claim 21.

* * * * *